United States Patent
Profous et al.

(10) Patent No.: US 9,857,187 B2
(45) Date of Patent: Jan. 2, 2018

(54) APPARATUS AND METHOD FOR ROUTE SEARCHING

(71) Applicant: TomTom Development Germany GmbH, Leipzig (DE)

(72) Inventors: Andreas Profous, Berlin (DE); Johannes Robert Fischer, Berlin (DE); Andreas Menge, Berlin (DE)

(73) Assignee: TOMTOM NAVIGATION B.V., Amsterdam (NL)

( * ) Notice: Subject to any disclaimer, the term of this patent is extended or adjusted under 35 U.S.C. 154(b) by 0 days.

(21) Appl. No.: 14/411,552

(22) PCT Filed: Jul. 1, 2013

(86) PCT No.: PCT/EP2013/063804
§ 371 (c)(1),
(2) Date: Dec. 29, 2014

(87) PCT Pub. No.: WO2014/001565
PCT Pub. Date: Jan. 3, 2014

(65) Prior Publication Data
US 2015/0149078 A1    May 28, 2015

(30) Foreign Application Priority Data

Jun. 29, 2012 (GB) .................................. 1211644.8
Jun. 29, 2012 (GB) .................................. 1211645.5

(51) Int. Cl.
*G01C 21/34* (2006.01)
*G01C 21/36* (2006.01)

(52) U.S. Cl.
CPC ..... *G01C 21/3446* (2013.01); *G01C 21/3469* (2013.01); *G01C 21/3476* (2013.01); *G01C 21/3679* (2013.01)

(58) Field of Classification Search
CPC ............ G01C 21/3469; G01C 21/3697; G01C 21/3679; G01C 21/3446
See application file for complete search history.

(56) References Cited

U.S. PATENT DOCUMENTS

| 5,568,390 A | 10/1996 | Hirota et al. |
| 6,785,608 B1 | 8/2004 | Milici et al. |
| 7,962,280 B2 | 6/2011 | Kindo et al. |

(Continued)

FOREIGN PATENT DOCUMENTS

| CN | 102161318 A | 8/2011 |
| CN | 102483333 A | 5/2012 |

(Continued)

OTHER PUBLICATIONS

Search Report dated Oct. 24, 2012 for United Kingdom Patent Application No. 1211644.8.

(Continued)

*Primary Examiner* — Basil T. Jos

(57) ABSTRACT

Embodiments of the present invention provide a one-to-many route searching method comprising searching map data to select links to form a plurality of routes from a departure node according to a cost function, and determining an extent of each route according to an objective function, wherein the searching of the map data is performed to a search boundary based upon a cost of an unreachable node.

17 Claims, 6 Drawing Sheets

(56) References Cited

U.S. PATENT DOCUMENTS

| | | | |
|---|---|---|---|
| 8,150,620 B2 | 4/2012 | Motoyama | |
| 8,774,995 B2 | 7/2014 | Ishibashi | |
| 2009/0271105 A1 | 10/2009 | Kindo et al. | |
| 2010/0262359 A1 | 10/2010 | Motoyama | |
| 2011/0166810 A1* | 7/2011 | Grider | B60L 15/2045 702/63 |
| 2011/0202219 A1* | 8/2011 | Ishibashi | B60L 11/1809 701/22 |
| 2011/0288765 A1* | 11/2011 | Conway | G01C 21/3469 701/533 |

FOREIGN PATENT DOCUMENTS

| | | |
|---|---|---|
| DE | 102008037262 A1 | 5/2009 |
| DE | 102009034508 A1 | 1/2011 |
| EP | 0638887 A2 | 2/1995 |
| EP | 1926074 A1 | 5/2008 |
| JP | H01142825 A | 6/1989 |
| JP | H02278116 A | 11/1990 |
| JP | 2000283774 A | 10/2000 |
| JP | 2006071555 A | 3/2006 |
| JP | 2007055484 A | 3/2007 |
| JP | 2008096209 A | 4/2008 |
| JP | 2010122117 A | 6/2010 |
| JP | 2010261893 A | 11/2010 |
| WO | 2011029562 A1 | 3/2011 |

OTHER PUBLICATIONS

Search Report dated Oct. 8, 2012 for United Kingdom Patent Application No. 1211645.5.
International Search Report dated Sep. 19, 2013 for International Application No. PCT/EP2013/063803.
International Search Report dated Sep. 19, 2013 for International Application No. PCT/EP2013/063804.

* cited by examiner

APPARATUS AND METHOD FOR ROUTE SEARCHING

CROSS-REFERENCES TO RELATED APPLICATIONS

This application is the National Stage of International Application No. PCT/EP2013/063804, filed Jul. 1, 2013 and designating the United States. The application claims priority from United Kingdom Patent Application No. 1211644.8 filed Jun. 29, 2012 and United Kingdom Patent Application No. 1211645.5 filed Jun. 29, 2012. The entire content of these applications is incorporated herein by reference.

FIELD OF THE INVENTION

This invention relates to mobile devices, and preferably navigation systems. Illustrative embodiments of the invention relate to portable navigation devices (so-called PNDs), in particular PNDs that include Global Positioning System (GPS) signal reception and processing functionality. Other embodiments relate, more generally, to any type of mobile processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the drivers own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, TomTom International B.V provides an on-line route planning and navigation facility at http://routes.tomtom.com, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the Go Live 1000 model manufactured and supplied by TomTom International B.V., provide a reliable means for enabling users to navigate from one position to another.

A navigation device user may often be concerned about how far they can travel in a vehicle having a current fuel load. In the case of a conventional combustion engine vehicle, the current fuel load of petrol, diesel, etc. However, in the increasingly common case of an electric vehicle (EV), the amount of charge current carried by the vehicle batteries. Such a concern is often referred to as "range anxiety" where the user is concerned about reaching a destination, such as a charging point, without becoming stranded.

A basic solution to displaying the reachable range of the vehicle to the user is to display on a map a circular "reachable area" based upon the current vehicle location and fuel load. However, this is a simplistic representation which is not representative of the road layout and other factors which affect the vehicle's range.

EP 0638887 A2 discloses a navigation system which displays a reachable range of a vehicle. To determine the reachable range from a present position a minimum cost of all nodes coupled with the present position is calculated. The cost of each link is calculated as an amount of fuel used. It can be discriminated whether or not the fuel amount used exceeds the amount of fuel being carried by the vehicle. When the minimum cost does not exceed the fuel being carried, the minimum cost calculation is repeated for the next node connected with the node previously calculated is carried out. The reachable nodes or reachable area can then be displayed upon a display of the navigation system. The method of EP 0638887 A2 does not, however, account for any routing preferences of the navigation system. Furthermore, the method may be inefficient in that the reachability of all nodes connected either directly or indirectly to the current node must be considered which is computationally inefficient.

The present invention provides an improved system and method for determining reachable locations of a vehicle. Embodiments of the present invention may address one or more problems existing in the prior art.

SUMMARY OF THE INVENTION

Embodiments of the invention relate to a method of determining an area according to one or more constraints. In the described example the constraint is a fuel load of a vehicle. However it will be realised that other constraints may be considered, such a time or distance limit. For example an area may be determined which is within 15 minutes travel time, or an area with a walking distance of 2 km. Other constraints may be considered which have maximum values and for which the value can be calculated value on any road or navigable path in a network. The constraints may be defined by one or more objective functions.

Embodiments of the invention relate to a one-to-many (OTM) search method. The OTM search method determines a plurality of locations according to two or more functions. A first function is a cost function which is based upon one or more route planning criteria. The first function may be to determine a fastest route having lowest travelling time i.e.

the cost relates to travel time. It will be realised that other cost function may be used, as will be explained. At least one further function is an objective function which limits the search method. For example the objective function may be reachability based upon a fuel load of a vehicle, or distance. It will be realised that the cost function and one or more objective functions may not be co-terminus. In other words, a route determined on the basis of the cost function may not be the best route to maximise the one or more objective functions, i.e. the route may not be the most efficient or the shortest.

Embodiments of the invention relate to a combination of the foregoing embodiments, i.e. displaying an area determined on the basis of a cost function according to one or more route planning criteria and one or more objective functions limiting the route.

According to an aspect of the invention, there is provided a method for displaying a reachable area, comprising:

determining a plurality of maximal reachable locations from an initial location based on a route search using digital map data;

selecting, for each of a plurality of regions arranged around the initial location, one of the reachable locations according to at least one criteria; and displaying on a display device an area shaped according to the selected reachable locations.

The plurality of regions may be sectors arranged radially around the initial location. The reachable locations may be selected according to a distance from the initial location. The reachable locations may be selected to be a reachable location which is a furthest distance from the initial location within each region. The route search may be based upon a cost function and at least one objective function. The cost function may determine a cost of each road segment based upon one or more of: length, travelling time and/or travelling speed. The route search may select road segments having a lowest cost. The at least one objective function may limit the route search based upon one or more of: energy cost, travelling time and/or travelling distance. The route searched may be performed within a search boundary. The search boundary may be based upon a cost of a route to an unreachable node. The search boundary may be arranged beyond the unreachable node. The cost of the route to the unreachable node may be determined according to the at least one objective function. The area may be shaped by interconnecting the selected reachable locations. The reachable locations may be interconnected by arcuate lines. The method may comprise retrieving a location of one or more points of interest (POI) around the initial location and determining a reachability of each POI according to the at least one objective function. The route search may be a single-source multi-destination route search having the initial location as a source location. A reachability of a node may be determined based upon a route from the source location selected according to the cost function.

According to a further aspect of the present invention there is provided a navigation device, comprising a display device and a processor, the processor being arranged to execute a reachable area module (RAM), wherein the RAM is arranged to:

perform a route search using digital map data to determine a plurality of maximal reachable locations from an initial location;

select, for each of a plurality of regions, one of the reachable locations according to at least one criteria; and display on the display device an area shaped according to the selected reachable locations.

The RAM may be arranged to display first and second areas upon the display device, wherein the first area is determined according to a fuel load of a vehicle associated with the navigation device and a first safety margin and the second area is determined according to the fuel load and a second safety margin. The reachable locations may be selected according to a respective distance from the initial location. The reachable locations may be determined to be a maximum distance from the initial location within each region. The RAM may be arranged to determine the shape of the area by interconnecting the reachable locations in adjacent regions.

The present invention also provides computer software operable, when executed on a mobile system as described herein above, to cause a processor to determine a plurality of maximal reachable locations from an initial location based on a route search using digital map data; select, for each of a plurality of regions arranged around the initial location, one of the reachable locations according to at least one criteria; displaying on a display device an area shaped according to the selected reachable locations. The computer software may be embodied on a non-transitory computer readable medium.

According to a further aspect of the present invention there is provided a one-to-many route searching method, comprising:

searching map data to select links to form a plurality of routes from a departure node according to a cost function; and determining an extent of each route according to an objective function, wherein the searching of the map data is performed to a search boundary based upon a cost of an unreachable node.

The search boundary may extend beyond the unreachable node. The unreachable node may be a first node selected according the cost function determined to be unreachable according to the objective function. The search boundary may have a cost based upon the cost of the unreachable node. The search boundary cost may be K*unreachable_cost, wherein the parameter unreachable_cost is the cost of the unreachable node and the parameter K is between 1 and 2. K may have a value between 1.2 and 1.8; preferably around 1.6. The cost of the unreachable node may be an accumulated cost of links between the departure node and the unreachable node along a route therebetween determined according to the cost function. Each route may be formed from a plurality of network links each having a lowest cost determined according to the cost function. The cost function may determine a cost of each link based upon one or more of length, travelling time and/or travelling speed of the link. The extent of each route may determined by the objective function based upon or more of energy cost, travelling time and/or travelling distance. The extent of each route is determined by the objective function from the departure node. Each link in the map data may have an associated importance and the searching only selects links having an associated importance of equal to or greater than a predetermined importance. One or more regions may be arranged around the departure node and/or one or more points-of-interest (POI) having an associated importance of less than the predetermined importance, and the searching is enabled to selected links within the respective regions having an importance of equal to or greater than the importance associated with the region. The searching may be enabled to select links from a node having an associated importance of less than the predetermined importance if a link having the node as an endpoint has an associated importance of less than the predetermined importance. The importance associated with each link may be a functional road classification (FRC).

According to another aspect of the present invention there is provided a computing device, comprising a processor and a memory storing map data, the processor being arranged to execute a one-to-many route searching module for searching the map data to determine a plurality of routes from an initial node, wherein the module is arranged to search the map data up to a search boundary to select links to form the plurality of routes according to a cost function, and to determine an extent of each route according to an objective function; and the search boundary is based upon a cost associated with an unreachable node.

The search boundary may have a cost greater than the unreachable node. The module may be arranged to select a link from each visited node having a lowest cost determined according to the cost function to form each of the plurality of routes. The module may be arranged to determine a cost of the search boundary according to K*unreachable_cost, wherein the parameter unreachable_cost is the cost of the unreachable node and the parameter K is between 1 and 2. K may have a value between 1.2 and 1.8; preferably around 1.6. The module may be arranged to determine a cost of each link based upon one or more of length, travelling time and/or travelling speed of the link. The module may be arranged to determine the extent of each route according to the objective function based upon or more of energy cost, travelling time and/or travelling distance.

The present invention also provides computer software operable, when executed on a mobile system as described herein above, to cause a processor to perform a one-to-many searching method, comprising: searching map data to select links to form a plurality of routes from a departure node according to a cost function; and determining an extent of each route according to an objective function, wherein the searching of the map data is performed to a search boundary based upon a cost of an unreachable node. The computer software may be embodied on a non-transitory computer readable medium.

BRIEF DESCRIPTION OF THE DRAWINGS

Various embodiments of the present invention will now be described with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of mobile processing device that is configured to execute navigation software so as to provide route planning and navigation functionality. It follows therefore that in the context of the present application, a navigation device is intended to include (without limitation) any type of mobile device featuring route planning and/or navigation functionality, irrespective of whether that device is embodied as a PND, a navigation device built into a vehicle, or a mobile telephone or portable digital assistant (PDA)) executing route planning and navigation software.

Figure 1:
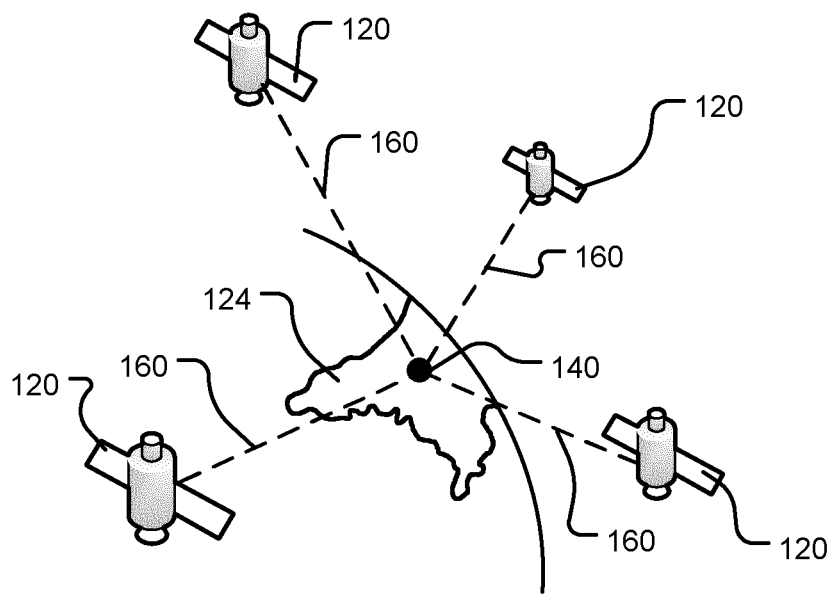
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
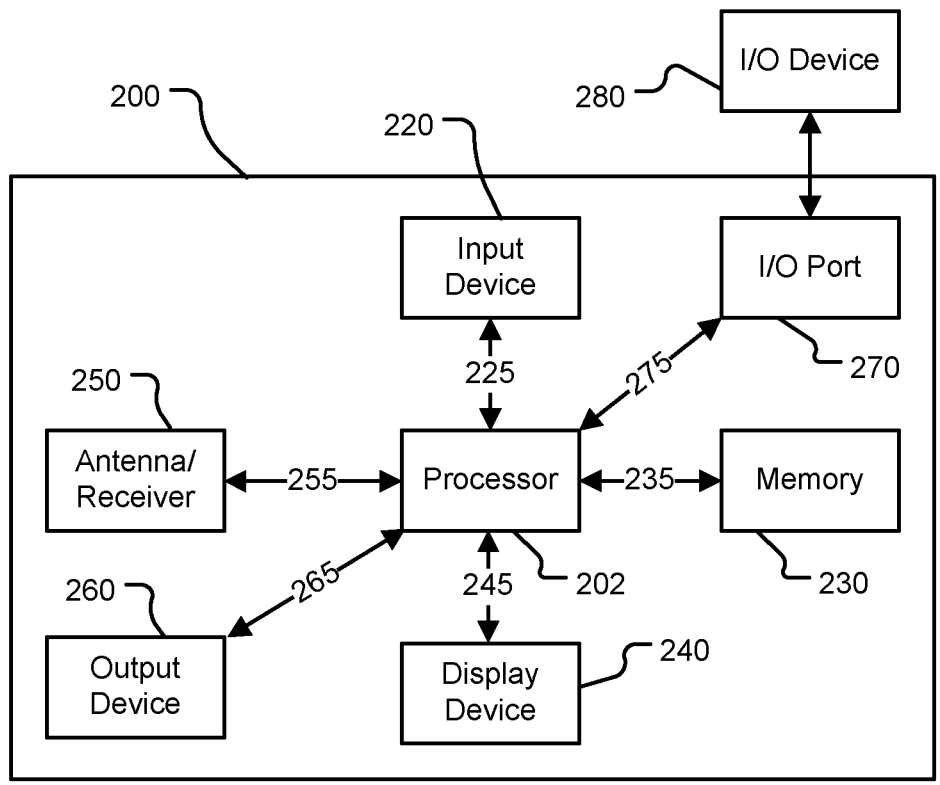
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
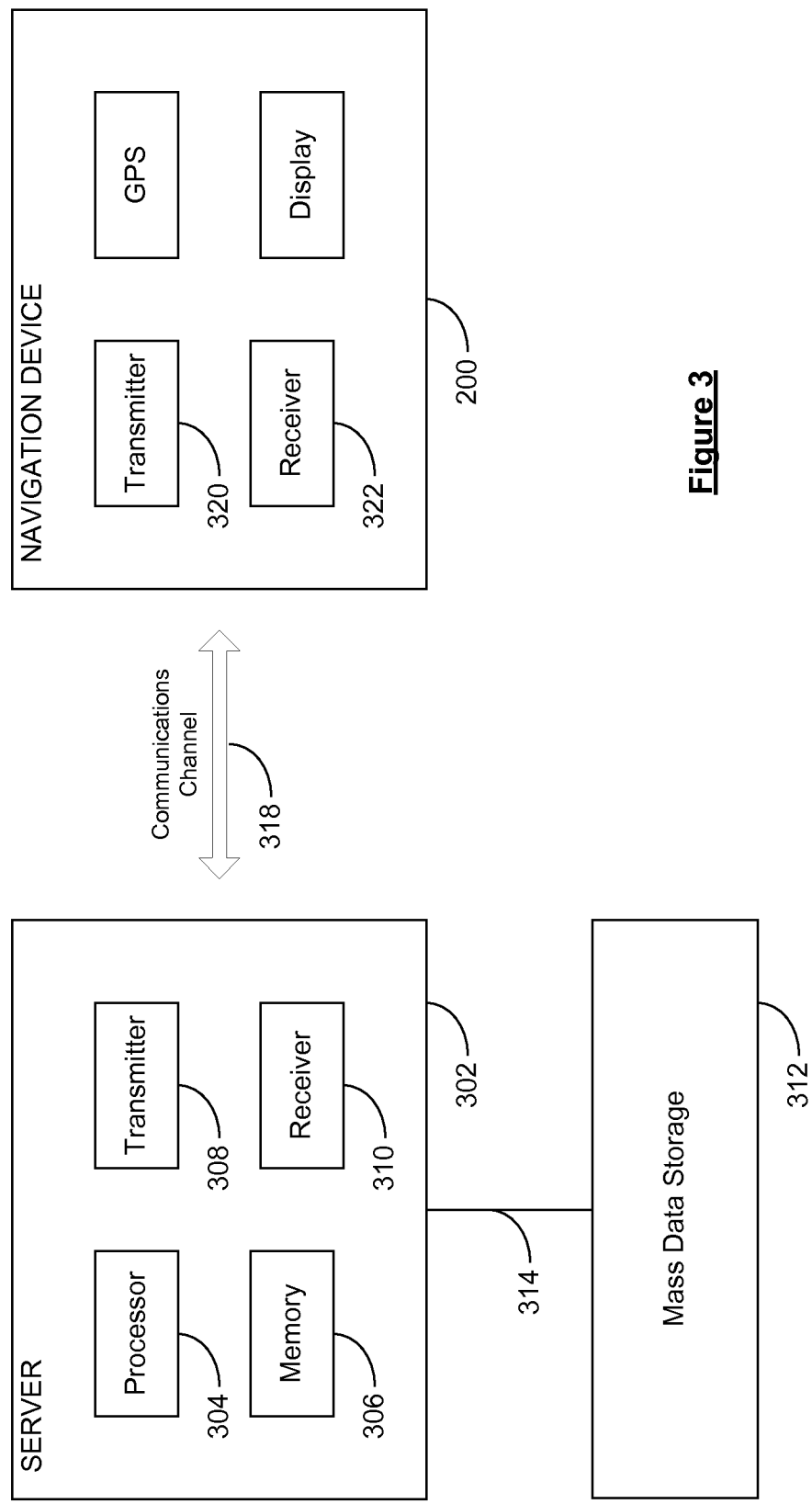
FIG. 3 is a schematic illustration of the manner in which a navigation device may receive information over a wireless communication channel.
Figure 4:
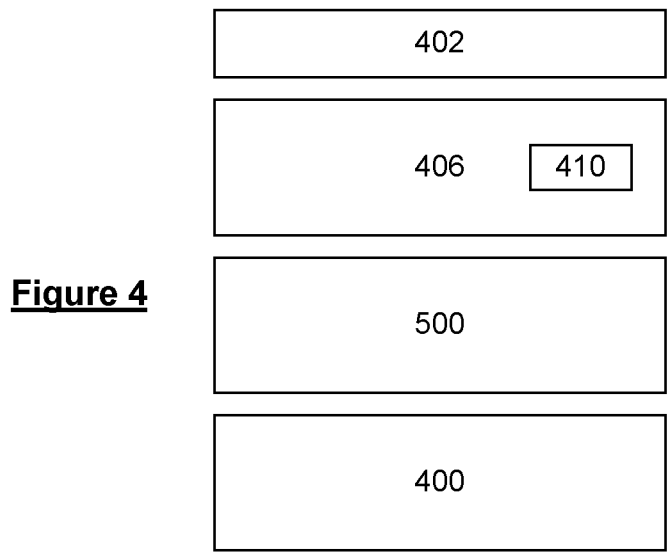
FIG. 4 shows a preferred embodiment of a software stack on a preferred mobile navigation device.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 5:
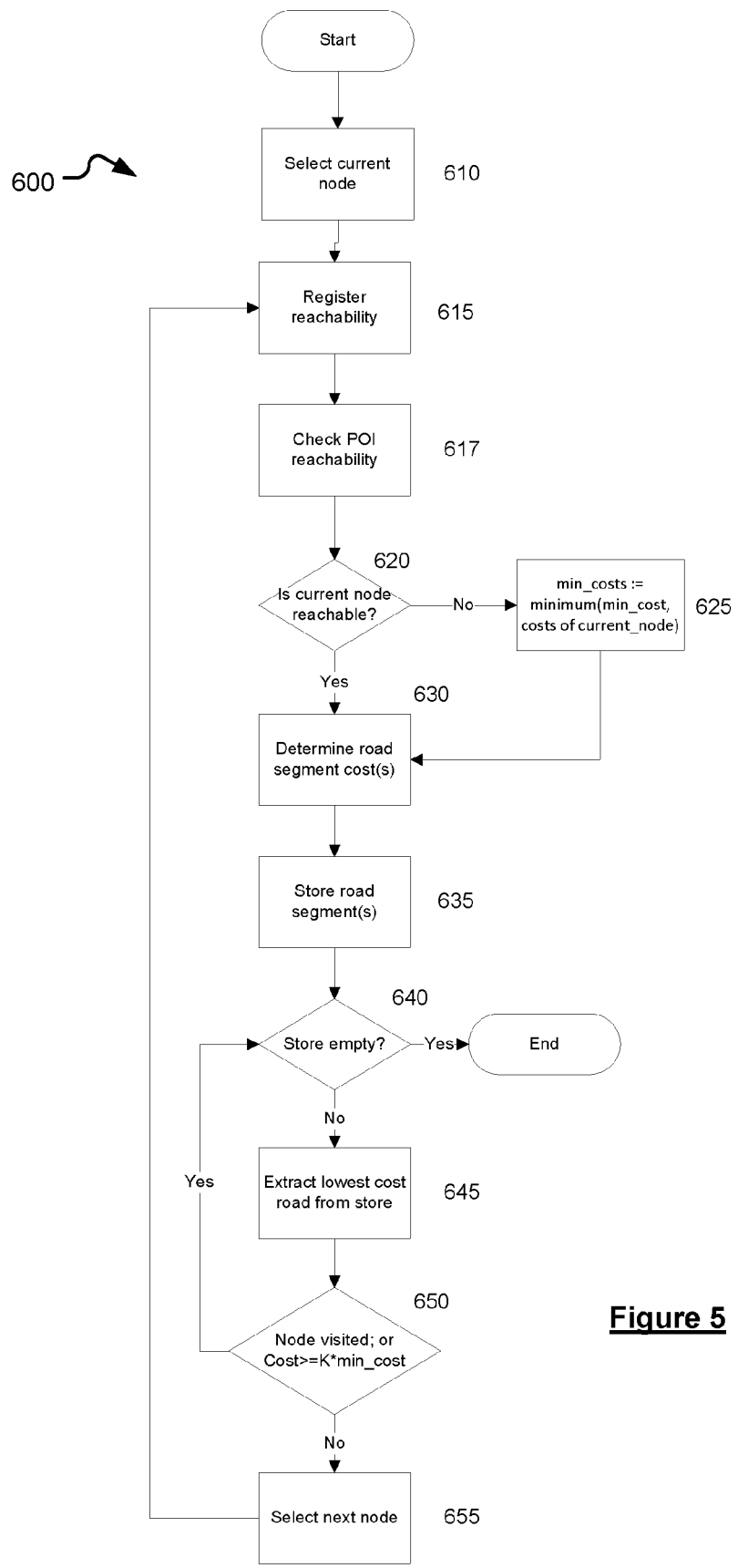
FIG. 5 is a method according to an embodiment of the invention.

FIG. 5 shows a software stack that may be used in a preferred embodiment of the mobile navigation device 200. The stack comprises an OS kernel 400. This may include display drivers, keypad drivers, camera drivers, power management, audio drivers, etc. The stack also comprises libraries 500, e.g. including graphics libraries, runtime libraries etc. The stack also comprises an application framework 406, which includes a reachable area module (RAM) 410 and may also include, for example, a window manager, resource manger notification manger, a telephony manager, etc. The stack also comprises the one or more applications 402.

In embodiments of the invention, the RAM 410 determines a reachable area based upon a current fuel load of a vehicle. It will be understood that the reachable area is an area typically having a non-regular shape, which indicates a range of the vehicle. Whilst embodiments of the invention will be described with reference to an electric vehicle (EV) it will be understood that the usefulness of the present invention is not limited to this and embodiments of the invention may be useful with reference to any type of fuel. In embodiments of the invention, the reachable area is determined based upon one or more routing planning criteria of the navigation device 200, as will be explained.

A method 600 for determining a reachable area according to an embodiment of the invention is shown in FIG. 5. The method 600 determines a reachable area based upon one or more route planning criteria and the fuel load of a vehicle associated with the RAM 410, typically the vehicle carrying the navigation device 200. The method 600 will be explained with reference to an example road network shown in FIG. 6.

As will be appreciated, a navigation device 200 may be used to plan a route between start and destination locations according to one or more route planning criteria. The route planning criteria may be to avoid certain road types, to travel via a shortest distance between the start and destination locations, etc. Usually the route planning criteria is to travel between the start and destination locations via a fastest route (least time). However other route planning criteria may be to travel via a most economical route, i.e. having least fuel consumption. Such an economical route may be determined based upon speed information which may be used to determine anticipated vehicle accelerations, i.e. going from a low speed road to a high speed road may require significant acceleration, and may also take into account road gradient/altitude information (to avoid if possible roads having an incline). In order to calculate the route according to the route planning criteria a cost is determined for each road segment according to a cost function. Where the route planning criteria is the shortest route the cost may be based solely on the length of the route segment. However, where the route planning criteria is the fastest route, the cost for the road segment may be based upon one or more of: factors associated with the road segment (road type, speed limit, etc); factors associated with the user of the navigation device (average driving speed, etc) and other external factors (weather, traffic, etc.). Thus a cost is determined for each road segment based upon the cost function relating to the route planning criteria.

To implement the method 600, some embodiments of the invention utilise a data storage structure known as a heap. The heap is used to store road segments during execution of the method 600 and to return the road segment stored in the heap which best meets one or more route planning criteria. Road segments are stored in the heap associated with a routing cost.

When road segments are stored on the heap, a first extracted road segment is that having the lowest cost. For ease of explanation the method 600 will be explained with reference to a fastest (least time) route planning criteria, although it will be appreciated from the foregoing that other route planning criteria may be chosen, such as according to a user preference of the navigation device 200.

The method 600 utilises a single-source multi-destination Dijkstra algorithm to determine routes based upon the cost function, although it will be realised that other single source multi-destination route planning algorithms may be used.

In step 610 a current node is selected. The current node is a node from which the method 600 determines the reachable area, i.e. the source or departure node. In some embodiments the current node may correspond to a current location of the navigation device 200 executing the RAM 410. However, in other embodiments where the method 600 is being executed by a computing device remote from the navigation device 200, such as a server, the current node may be the location of a navigation device communicably coupled to the server. For convenience the method 600 will be explained as being executed by the RAM 410 of the navigation device 200 located at node 1 in the example road network shown in FIG. 6.

In step 610 a variable min_cost is initialised to a predetermined value. The predetermined value is a value sufficiently high value to denote that an actual minimum cost has not yet been determined. The variable min_cost is used to store a cost value for a first node found by the method 600 which is not reachable. By not reachable it will be understood that it is meant that the node may not be reached by limitation of the one or more objective functions.

In embodiments of the method 600, a search boundary is determined to limit a search area of the method 600, the search area being an area within which the method 600 determines the reachable area. It is necessary to search beyond an area constrained by the one or more objective functions in order to sufficiently explore the area around the departure node.

In embodiments of the invention, the search boundary is determined based upon an accumulated cost to reach an unreachable node. The search boundary is determined to be a predetermined extent beyond the accumulated cost of the unreachable node, as will be appreciated from the description below. Whilst the search boundary is based upon the accumulated cost of the first unreachable node in the embodiments described below, it will also be appreciated that the search boundary may be determined upon the accumulated cost of another unreachable node, such as the second, third, etc node. Furthermore, in embodiments of the invention, whilst the accumulated cost of one node may be used to determine the search boundary, the accumulated cost may be based upon the cost of a plurality of nodes, such as an average accumulated cost of a first plurality of unreachable nodes.

As explained above, the search boundary limits the extent to which the method searches outward from the departure node to find unreachable nodes. If the method 600 terminated upon finding a first unreachable node, since the method preferentially searches routes best matching the route planning criteria, routes which are less favourable to the route planning criteria may not be sufficiently searched or explored. However allowing the method 600 to search along most preferred routes in an unconstrained manner to allow sufficient searching of less preferred routes closer to the source location may be detrimental in terms of wasted processing resources. The search boundary balances sufficient searching of less preferred routes closer to the source location by causing searching of more preferred routes to be terminated once they have extended sufficiently beyond the first one or more unreachable node(s).

As discussed above, the route planning criteria of the navigation device 200 may be to determine the fastest route to the destination. Thus the cost function is based upon travel time. Some embodiments of the method 600 aim to determine the reachable area of the vehicle. It will be appreciated that the conditions to obtain the maximum range of the vehicle may be divergent, at least partly, with the route planning criteria. Where the route planning criteria is to find the fastest route, the route may naturally follow road segments which are not the most fuel or energy efficient to traverse. For example, a road segment corresponding to a highway may be the fastest road segment, due to its higher speed limit and/or average travelling speed, but at the same time, the average travelling speed may be higher than the most economic travelling speed of the vehicle. Thus, the variable min_cost and the search boundary based thereon are used to balance these competing requirements by limiting the search area to find an extent of the reachable area without unnecessarily searching road segments which cannot be reached.

In step 615 the reachability of the current node is registered or stored. That is, it is determined whether the current node is reachable given the current fuel of the vehicle and the reachability of the node is stored to determine the reachable area according to an embodiment of the invention, as will be further explained later. Since usually for the first iteration of step 615 the current node is the current location of the navigation device 200 its reachability will be assured. The node is also marked as visited by the method 600.

In step 617 it is checked if the node is associated with a point of interest (POI) and, if so, the reachability of the POI is checked. As explained, some embodiments of the invention relate to determining a reachable area from a departure node given a fuel load of a vehicle, a maximum travel time or maximum travel distance, etc. Particularly in the case of determining the reachable area given the fuel load of the vehicle, it is expected that the driver will be interested in reaching a refuelling location, such as a garage or EV charging point, hereinafter POI, although it will be realised that POIs are not limited to these types of location. In these embodiments, the method 600 may obtain the locations of POIs around the departure node, such as POIs within a given window or radius of the departure location. These POI locations may be obtained from local storage or a remote server. Each POI is associated with a nearest node in the road network. In step 617 if the node is associated with a POI, the reachability of the POI is checked. For example the POI may be a further 2 km away from the departure location than the node and thus the check ensures that the POI can also be reached from the departure node. In some embodiments of the method 600 an availability of the POI may also be checked. The availability may be dynamically determined or obtained. The availability may comprise a current or future availability of the POI. For example, in the case of the POI being an EV charging station, the EV charging station provide an indication of its current availability, i.e. whether any free charging points are currently available. Alternatively or additionally, the EV charging station may have an associated booking system which allows users to book the station in advance for a period of time. Thus in step 617 either a current time or an expected time of arrival at the POI may be compared against the current or future availability of the POI to determine if the POI is or will be available. The POI may be indicated as unavailable if it is not available for use either at the current time or at the ETA at the POI. If the POI is unavailable an alternative POI may be given priority by the navigation device 200 for routing the user toward.

In step 620 the method branches depending upon whether the current node is reachable. If the current node is not reachable then the method moves to step 625 where the variable min_cost is set to a minimum of the accumulated routing cost of the current node or the current minimum most stored by min_cost. However if the current node is reachable, then the method moves to step 630.

Figure 6:
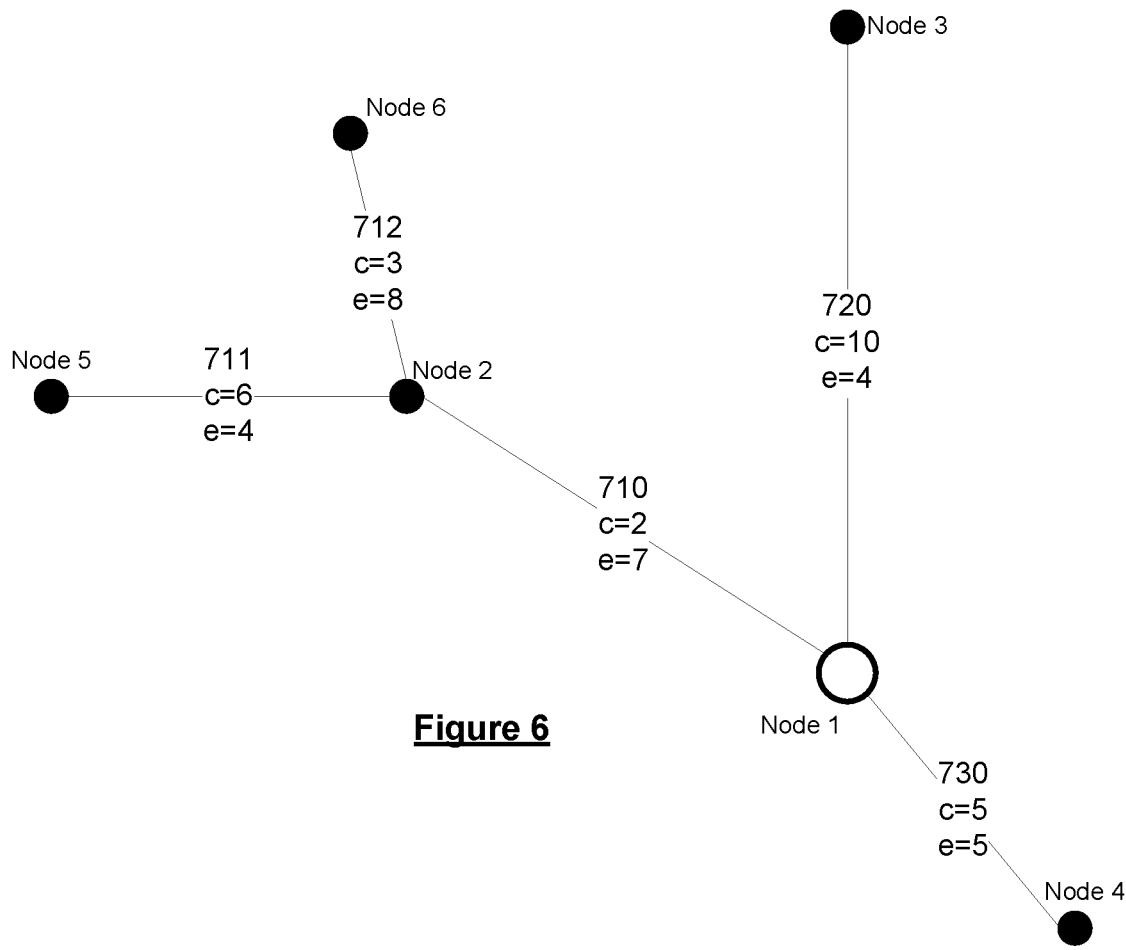
FIG. 6 is an illustration of an example road network.

In step 630 a cost for all road segments adjacent the current node is determined. Typically the cost of each road segment is obtained from digital map data. However the cost may also include a dynamically calculated component, such as based upon weather to traffic information. The costs are determined based upon the cost function associated with the OTM search. The cost function may be based upon the routing preferences set by the user of the navigation device. Referring to FIG. 6, the cost (c) for road segments 710, 720, 730 adjacent node 1 are determined as, respectively, 2, 10 and 5. Although FIG. 6 is not drawn to scale, it will be noted that even though the road segment 710 appears longest, due to its higher speed limit, etc, it may have a lower cost than road segment 730 which may be shorter but a relatively slow road.

In step 630 an objective function cost is determined, which in the described example is an energy cost for each road, although it will be realised that a cost appropriate for another objective function may be determined in step 630. In embodiments where a plurality of objective functions are used, the objective function cost for each is determined in step 630. It will be understood that the term energy cost is the cost in terms of vehicle fuel to traverse an associated road segment. Thus the energy cost enables a comparison of accumulated energy cost to reach a node with the fuel load of the vehicle to determine whether the node is reachable.

The energy cost for a road segment—"e" in FIG. 6—may be based upon one or more factors. The factors may include the travelling speed for the road segment (speed limit, user travelling speed, average of all users on road segment, traffic speed, etc), the altitude change of the road segment obtained from map data, etc. For each road segment an accumulated energy cost up to an end point of the road segment is determined as a sum of energy cost for all road segments from the initial node to the end of that road segment. The accumulated energy cost is used to determine whether the end node of the road segment is reachable based upon the fuel load of the vehicle.

As will be appreciated, for some vehicle fuel technologies, such as hybrid or electric vehicles, it is possible for the energy stored by the vehicle to increase as the vehicle traverses a road segment by recharging of the vehicle's battery, for example when the vehicle travels along a substantially downhill road segment. Thus the energy cost of a road segment is not necessarily positive (indicating the consumption of stored energy) and may be negative (indicating storage of further energy).

In step 635 the road segments adjacent the current node are stored on the heap. The road segments are stored with their associated values of accumulated routing cost (c) and accumulated energy cost (e). For the first iteration of step 635 with reference to FIG. 6 the road segments 710, 720, 730 are stored with associated accumulated routing costs 2, 10, 5 and accumulated energy costs 7, 4, 5 (for the first iteration from node 1 the accumulated routing cost and accumulated energy cost are the same as routing cost and energy cost of the segments).

In step 640 it is checked whether the store is empty, i.e. whether any road segments remain on the heap. If the store is empty, then the method ends. However, if the store is not empty the method moves to step 645.

In step 645 a road segment having the next lowest accumulated routing cost is extracted from the heap. For the first iteration of step 645 with reference to FIG. 6 the road segment 710 is extracted having an accumulated routing cost of 2.

In step 650 it is determined whether a node at an opposite end of the extracted road segment from the current node has been previously visited. Therefore, for the road segment 710, it is checked whether the node 2 has been visited. It is also checked whether the accumulated routing cost to reach the node is less than a search boundary cost which is based upon the minimum cost to reach the first unreachable node held by min_cost. In some embodiments the search boundary cost is a predetermined factor K applied to the value of the min_cost variable. For at least the first iteration where the variable min_cost still holds the predetermined initialisation value, the cost will be less than K*min_cost. In some embodiments the factor K is between 1.2 and 2, between 1.4 and 1.8 or around 1.6. For explanation the factor K=1.6 will be used. Thus the search boundary is set at a cost of 1.6 times the cost to reach the first unreachable node. This value has been found to provide an acceptable balance between fully searching an area around the departure node and searching too greater distance away from the departure node along road segments preferred by the cost function but which are unreachable, which may waste computing resources. Once the accumulated routing cost exceeds the search boundary cost the method 600 may end because a significant distance has been searched, although in the method shown in FIG. 5 steps 640-650 loop to ensure the heap is empty of road segments before the method ends.

For the first iteration, node 2 has not been visited and the accumulated cost to reach node 2 (for which c=2) is less than K*min_cost. The method therefore proceeds to step 655 where the node at the end of the road segment is selected as the next current node, i.e. node 2, is selected as the next current node and the method returns to step 615 where the new current node is checked for reachability and, if reachable, registered as reachable for the reachability area, as will be explained with reference to FIG. 8. The node is checked for reachability by comparing the accumulated energy cost against the fuel load of the vehicle.

As will be appreciated, steps 635-650 are repeated for a second iteration based upon the new current node (node 2). In step 630 the routing costs of road segments 711 and 712 are determined and these road segments added to the heap in step 635 as: segment 711, accumulated routing cost 8, accumulated energy cost 11; and segment 712, accumulated routing cost 5, accumulated energy cost 15.

In the next iteration of step 645 the road segment having the lowest accumulated energy cost is extracted from the heap. For the second iteration with reference to FIG. 6 this is either road segment 712 or road segment 730 as both have the same accumulated routing cost of 5. When two or more road segments having the same accumulated routing cost are stored in the heap, the heap may determine which to extract first based upon one or more other factors, such as the associated accumulated energy cost associated with the road segments.

Eventually after a number of iterations of the method a node will be selected as the next node in step 655 which is unreachable, i.e. its accumulated energy cost exceeds the fuel load of the vehicle. For this first unreachable node, step 620 moves to step 625 where the variable min_cost is updated to store the accumulated energy cost of the first unreachable node. The method then proceeds as before. However, when step 650 is reached since min_cost now stores the cost to reach the first unreachable node, rather than an initialisation value, a node may be determined to lie outside the search boundary determined by K*min_cost. When a node lies outside the search boundary the method returns to step 640 without searching further beyond the node. Thus the search boundary limits the extent to which the method searches outward from the departure node.

A method 800 according to a second embodiment of the invention will now be explained with reference to FIG. 7. The method 800 is similar to that previously described with reference to FIG. 5. For clarity, steps in the method 800 of FIG. 7 also appearing in FIG. 5 will not be described again unless their function differs and therefore the reader is referred to the previously described method 600.

Figure 7:
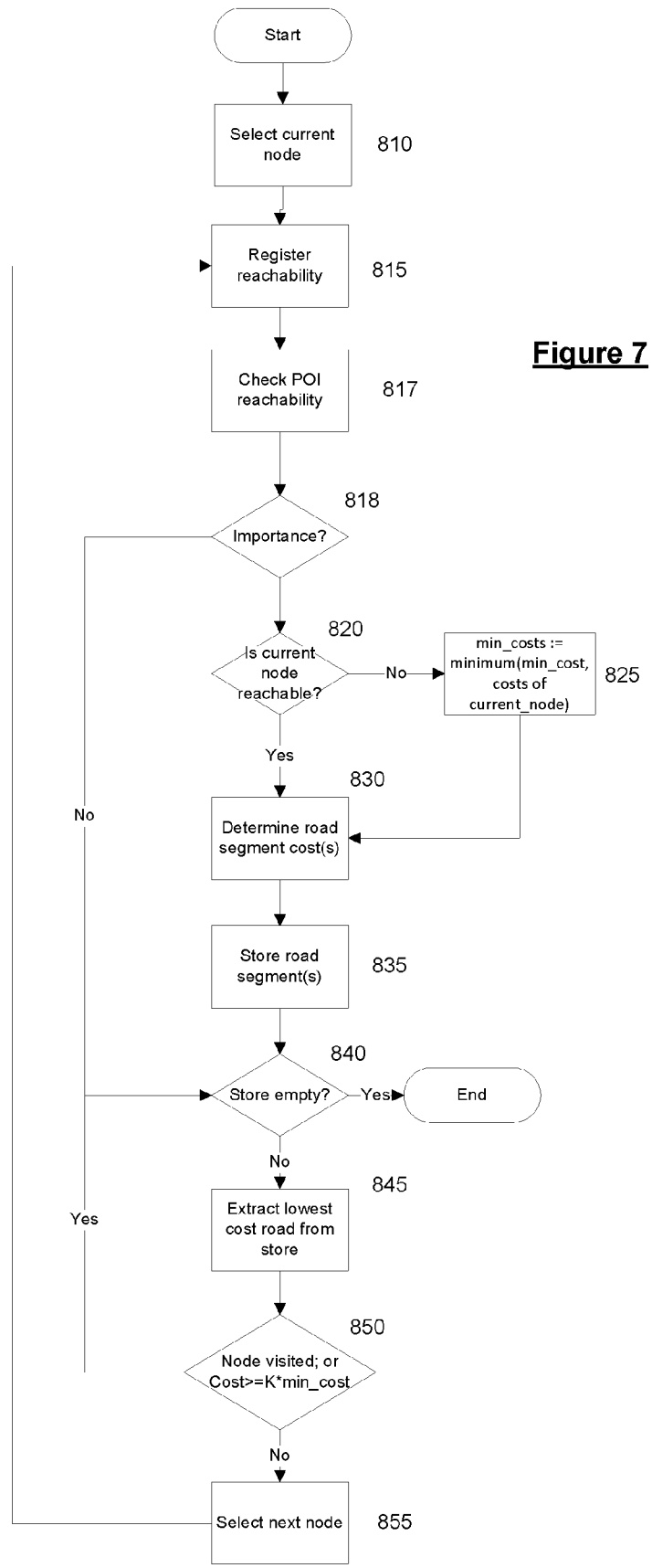
FIG. 7 is a method according to a further embodiment of the invention.

The method 800 of FIG. 7 reduces a computational resource required to determine the extent of the reachable area, thereby improving execution speed. The method 800 utilises importance information associated with each road segment to filter road segments not having a significant importance. The importance of each road segment may be a functional road class (FRC) associated with each road segment. The importance required for the method 800 to search a road segment depends upon one or more of: a distance from the departure node selected in step 810 or a POI; an importance of a road segment leading to the current node; and/or a default importance level, as will be explained. The method 800 of FIG. 7 includes an additional step 818 in which an importance of a road segment is checked to determine whether its routing cost is to be determined in step 830 and added to the store in step 835.

A default importance level is set for the method 800. The default importance level may correspond to an intermediate level of road importance in the map data, i.e. highways or major roads. If the importance level associated with a road segment does not equal or exceed the default importance level then it is not processed in steps 820-840. However it will be appreciated that road segments in a vicinity of the departure node or a destination node, such as the node associated with a POI, may need to be utilised even though they have an associated importance of less than the default level, otherwise a route may not be able to leave the departure node or reach the destination node. Therefore, one or more filter regions may be placed around the departure and destination node(s) associated with POIs within which road segments having an associated importance level of lower than the default level may be considered. The filter regions may be circular or otherwise shaped. In some embodiments, a plurality of concentric circular filter regions having inwardly decreasing importance levels may be placed around the departure and destination node(s). These concentric filter regions allow road segments of gradually decreasing importance to be considered closer to the departure and destination node(s).

Furthermore, in some embodiments, road segments may also be processed in steps 820-840 having an importance level of equal to or greater than the road segment leading to the current node when this is less than the default importance level. This prevents a road segment being followed, for example away from the departure node, to a node within the default importance level where only road segments adjoin that node having an importance of less than the default level. In this case the method 800 could not follow any road segments away from the node due to their associated importance being less than the default level.

Pseduocode for step 818 may include some or all of the following "if" statements: (1) if an importance of a road segment is at least the default level; (2) if an importance of a road segment is at least an importance level associated with a region around a departure, destination node or POI; or (3) if an importance of a road segment is equal to or greater than a road whose endpoint is the current node; then proceed to step 820.

As can be appreciated, statement (1) prevents the method 800 searching road segments which are not the default level, thus only allowing the method 800 to search road segments having a significant importance, i.e. at least the default level. Statement (2) allows the method 800 to search road segments having an associated importance level which is less than the default level when proximal to either a departure or destination node. When two destination nodes are closely located such that their respective filter regions partly overlap, the filter region having the lowest importance may be used to determine whether to process road segments. Statement (3) allows road segments to be followed having an associated importance of less than the default level when a node is arrived at via a road segment of equal or less importance. For example, if the route being determined arrives at a node via a road segment having an associated importance of less than the default level, the route is permitted to follow a road segment from the node having an associated importance of less than the default level and equal to or greater than the importance of the road segment arriving at the node. This exception allows "level creep" where road segments of less than the default importance level are followed, for example out of a filter region associated with a departure node. The search boundary determined by K*min_cost also prevents the method searching too many roads of less than the default level of importance.

As noted above with reference to FIGS. 5 and 7, in steps 615 and 815 each reachable node is used to determine the shape of the reachable area. The reachable area may be determined to have an irregular shape. Thus the reachable area may be shaped as a patatoid, i.e. an area having non-particular smooth shape. However it will be realised that the reachability area may be shaped as a regular shape and/or a polygon.

In embodiments of the invention, each reachable node is allocated to one of a plurality of regions based on the location of the node. It is determined whether the node is a maximal reachable node from the departure node within the respective region. The maximal reachable node in each region is used to determine the shape of the reachable area.

Figure 8:
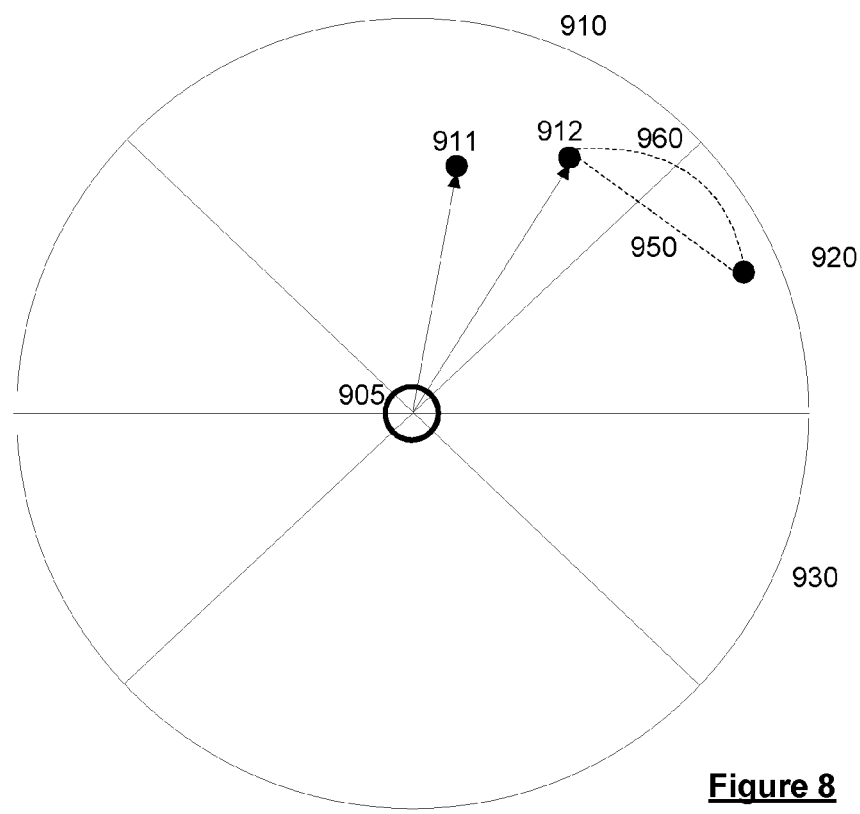
FIG. 8 is an illustration of a reachable area determination according to an embodiment of the invention.

Embodiments of steps 615 and 815 will now be described with reference to FIG. 8. In step 615, 815 it is determined whether a node selected in step 655, 855 is reachable. If the node is reachable, it is determined whether the node should be utilised to determine the shape of the reachable area to be displayed to the user. As noted above, whether a node can be reached is determined by comparing a current fuel load of the vehicle, for example obtained from a control system of the vehicle, with an accumulated energy cost required to reach the node via the road segments selected by the search method 600, 800 according to the cost function. In one embodiment, a first reachable area may be determined based upon the fuel level of the vehicle. The fuel level may be compared against the accumulated energy cost required to reach a node. However, in another embodiment, the fuel level may be subject to a safety margin of, for example, −5%, −10% or −15%, whereby the fuel level subject to the safety margin is compared against the accumulated energy cost to reach each node, although it will be realised that other safety margins may be considered. In some embodiments, two or more reachable areas may be determined by the search method 600, 800. A first reachable area may be determined including a first safety margin of, for example, −10% or −15%. A second reachable area may be determined based on a second safety margin different to the first safety margin of, for example, −7.5% or −5%. The second safety margin may, in some embodiments, be a positive margin applied to the vehicle fuel load of, for example, 5 or 10%. In this way, step 615, 815 determines whether the node may be reached based upon the fuel load of the vehicle and an accumulated energy cost of the road segments between the departure node and the node selected by the search method.

If it is determined that the node may be reached, then it is determined whether the node should be used to shape the reachable area. In embodiments of the invention, a region around the departure node is divided into a plurality of sub-regions. In some embodiments the region around the departure node is divided into a plurality of sectors. FIG. 8 illustrates the region around the departure node 905 divided into 8 sectors, denoted as 910, 920, 930 . . . (only some of which are numbered for clarity). However in other embodiments the region may be divided, equally or unequally, into fewer or more sectors. In some embodiments, the region may be divided into 32 sectors. It will be realised that increasing the number of sectors increases a resolution of the reachable area. In other embodiments the sub-regions may be arranged in a gird layout in the areas surrounding the departure node.

For each sector 910, 920, 930 a maximal reach node which is furthest from the departure node 905 is used to determine a shape of the reachable area. When a node is determined to be reachable, a distance of the node from the departure node 905 is determined. For each reachable area the maximal reachable node within each sector 910, 920, 930 from the departure node 905 is recorded and, if the next reachable node is determined to be further from the departure node 905, the maximal node from the departure node 905 is updated. Thus the method 600, 800 maintains a record of the maximal reachable node from the departure node 905 for each sub-region or sector 910, 920, 930. The distance may be an as-the-crow-flies distance as illustrated in FIG. 8. In embodiments where more than one reachable area is to be determined, such as the first and second reachable areas, as discussed above, a separate record of the maximal reachable node in each sector 910, 920, 930 is maintained for each reachable area.

Following execution of the method 600, 800 by the RAM 410 nodes in at least some of the sectors 910, 920, 930 surrounding the departure node are determined as the maximal reachable nodes. It will be realised that, depending upon the road network layout, a node may not lie in each sector. In this case the sector may be disregarded for drawing the reachable area. The reachable area is displayed upon the display screen 240 based upon the location of the furthest node in each sector. The furthest nodes may be connected with lines 950. In some embodiments, the reachable area is drawn by connecting the maximal reachable nodes with curved lines, such as circle segments 960. However the nodes may be connected by any line, such as straight lines.

Some embodiments of the invention include a sub-step within step 615, 815 which prevent an inconsistency between the determined reachable area and a route determined between two or more locations. The RAM 410 operatively determines the reachable area by performing a single-source multi-destination search according to one or more route planning criteria, as previously explained. Thus the reachable area is the area which is reachable by a particular route which meets the route planning criteria. However, not every possible route with a destination within the reachable area is itself reachable, because there might be a different reachable route with a further away destination. For example, the reachable area is not the route which is reachable by all fastest routes where this is the route planning criteria. Therefore when a route is planned between the source location and a destination location the route may be determined to be unreachable at a mid-point which is inconsistent with the reachable area determined by the RAM 410. Whilst such inconsistency may be avoided by increasing the number of regions 910, 920, 930 around the departure node 905, thereby effectively increasing the resolution of the determined reachable area, some embodiments of the invention may replace the determined maximally reachable location in one or more regions 910, 920, 930 with the maximally reachable location determined along the route between the source location and destination location, such that the reachable area is consistent with the reachable portion of the route.

Furthermore, in some embodiments of the invention a location at an intermediate location of a road segment may be used to define the maximally reachable location for one or more regions 910, 920, 930. As explained above, nodes in the road network are used to determine the maximally reachable locations. However if a road network exists which does not have any nodes present in one or more of the regions 910, 920, 930, then the maximally reachable location for that region would not be determined. For example, the maximally reachable locations would not be determined for a region 910, 920, 930 where a road segment traverses the region but does not include a node in that region 910, 920, 930. In some embodiments, step 615, 815 may include a sub-step of detecting regions for which a maximally reachable location has not been determined. For these regions, the maximally reachable location may then be determined to be a location along a road segment which traverses the region 910, 920, 930 but does not terminate with a node in the region 910, 920, 930.

Figure 9:
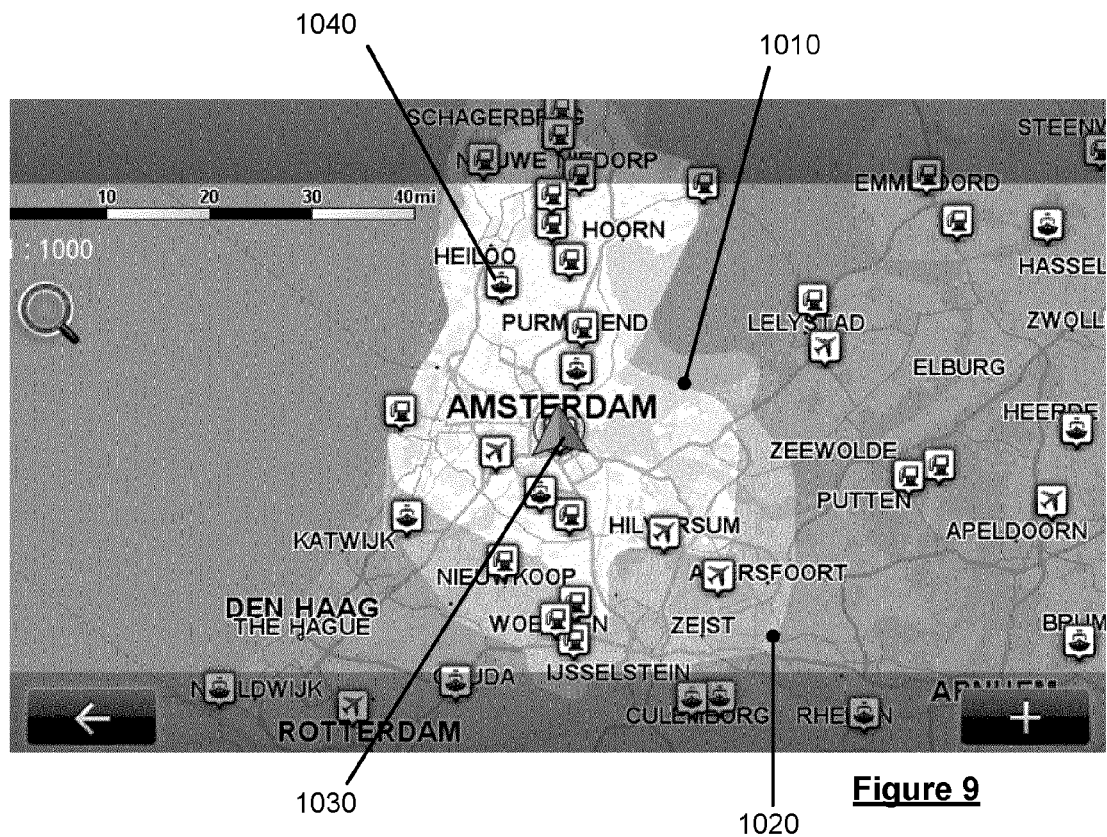
FIG. 9 is an illustration of a reachable area displayed according to an embodiment of the invention.

FIG. 9 illustrates the display device 240 controlled by the RAM 410 to display a reachable area 1010 according to an embodiment of the invention. In the embodiment shown in FIG. 9 the RAM 410 causes the display of first and second reachable areas on the display based upon first and second safety margins as previously explained. The first reachable area 1010 is based upon a fuel load of the vehicle, whose position is indicated with icon 1030, having a first safety margin applied, whilst the second reachable area 1020 is based upon the fuel load having a second safety margin applied. The first safety margin may be a negative or zero margin, whilst the second safety margin may be a different negative value, such as less than the first negative value, zero or a positive value. In general the second safety margin will be less than the first safety margin. The first reachable area 1010 may indicate an area which is considered to definitely be reachable given the current fuel load, whilst the second reachable area 1020 may indicate an area which may be reachable given the fuel load. POIs such as fuel or EV charging stations are indicated in the display to inform the user of where reachable fuel or charging stations are located. An area which is not considered to be reachable (outside of both the first and second reachable areas 1010, 1020, is indicated in dark grey, whilst the area outside of the first reachable area and inside the second reachable area is indicated in light grey. An area inside the first reachable area is displayed at normal brightness. It will be realised that the reachable area(s) may be displayed in a variety of ways and the display in FIG. 9 is merely illustrative.

It will be appreciated that some embodiments of the present invention provide a one-to-many search method which utilises a cost function and one or more objective functions. Embodiments of the invention are not limited merely to determining an area reachable with a given fuel load. Embodiments of the invention are more widely applicable.

Embodiments of the methods 600, 800 described above may be used to determining a fleet coverage area. The fleet may be a fleet of commercial or emergency vehicles. A location of a vehicle of the fleet may be used as the departure node and the objective function may be a predetermined coverage range or response time (particularly in the case of an emergency vehicle) of the vehicle. When the method 600, 800 is executed for the vehicle, the OTM search method 600, 800 determine nodes of the road network around the vehicle location which can be reached which meet the objective function, for example by the emergency vehicle within the response time. Thus the reachable area of the vehicle according to the routing preference and the one or more objective functions is determined by the method 600, 800. The method 600, 800 may be re-executed for each of a plurality of vehicles in the fleet based upon their respective locations. The reachable area of each vehicle may be displayed upon a display device as explained with reference to FIG. 8. The display device may be that of a fleet controller, such as vehicle dispatcher, thus enabling the controller to visually observe areas which may not be reached by the fleet within the objective function(s) limitation, such as response time. The controller may issue instructions to one or more vehicle drivers to wait at different locations, depending on unreachable areas, such as to improve the overall fleet coverage area, i.e. to minimise areas of overlapping vehicle coverage within the response time of each vehicle.

In some embodiments, the method 600, 800 may be used for determining an area of a leisure activity. In these applications the cost function may be based upon a criteria associated with a links of a network within which the activity is performed. For example, the cost function may be based upon quality of a road or path for running or cycling. Thus the method 600, 800 preferentially selects roads or paths which are best suited to running or cycling. The objective function may be a desired running or cycling distance. In this way, the OTM search method 600, 800 may be used to determine a running or cycle route which preferentially follows most suited roads or paths and determines a route having a desired length or running/cycling time. The reachable area for such activities may also be displayed with reference to FIG. 8 and the associated description. When the reachable area is displayed as shown in FIG. 8, the location of one or more POIs may be used to influence the choice of user's route i.e. to enable the runner to enjoy landmarks by selecting a route directed toward more or interesting landmarks. Thus it will be realised that the POIs are not limited to being fuel stations or EV charging points. The POIs may be landmarks, such as within a city.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example, the navigation device may utilise other global navigation satellite systems, such as the European Galileo system. Equally, it is not limited to satellite-based systems, but could readily function using ground-based beacons or other kind of system that enables the device to determine its geographic location.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A computer implemented method of performing a one-to-many route search on digital map data, said digital map data comprising a plurality of links connected by nodes representing navigable paths of a network, the method comprising:
    searching the map data using a one-to-many route planning algorithm to explore links from a departure node so as to determine a reachable area for the departure node, said searching comprising: determining a first cost for each explored link using a cost function associated with the route planning algorithm; and determining a second cost for each explored link using an objective function, such that each node reached by the route planning algorithm has a first accumulated cost and a second accumulated cost, wherein the first accumulated cost is the minimum accumulation of first costs for links forming a route from the departure node to the node, wherein the second accumulated cost is the accumulation of second costs for the links forming the route from the departure node to the node, and wherein the reachable area is based on a predetermined second accumulated cost value, such that a node is identified as unreachable when the second accumulated cost for the node exceeds the predetermined second accumulated cost value,
    wherein the searching of the map data is limited to a search boundary, wherein the first accumulated cost value defining the search boundary is based upon the first accumulated cost of the first unreachable node identified by the searching of the map data,
    the method further comprising:
    causing a representation of the determined reachable area to be displayed on a display device.

2. The method of claim 1, wherein the first accumulated cost value defining the search boundary is determined by applying a predetermined factor to the first accumulated cost of the first unreachable node, such that the search boundary extends beyond the first unreachable node.

3. The method of claim 1, wherein the first accumulated cost value defining the search boundary is based upon the first accumulated cost of a plurality of unreachable nodes.

4. The method of claim 3, wherein the first accumulated cost value defining the search boundary is based upon the first plurality of unreachable nodes identified by the searching of the map data.

5. The method of claim 4, wherein the first accumulated cost value defining the search boundary is based upon the average first accumulated cost of the first plurality of unreachable nodes identified by the searching of the map data.

6. The method of claim 1, wherein the first cost for each explored link determined using the cost function associated with the route planning algorithm is based upon one or more of: length; travelling time; and travelling speed of the link.

7. The method of claim 1, where the cost function of the route planning algorithm is selected to determine one of: shortest routes; fastest routes; and most fuel or energy efficient routes, from the departure node.

8. The method of claim 1, wherein the second cost for each explored link determined using the objective function is one of: energy cost; travelling time; and travelling distance, such that the predetermined second accumulated cost value corresponds, respectively, to one of: a current fuel load of a vehicle; a maximum travel time; and a maximum travel distance.

9. The method of claim 1, wherein each link in the map data has an associated importance level, and said searching comprises determining the importance level of a link to be explored from a node and exploring the link only when the importance level is equal to or greater than a predetermined importance level, unless at least one of: (i) the link is in one or more regions defined around the departure node and/or a node associated with a point of interest (POI); and (ii) the node was reached from a link having an importance level less than the predetermined importance level.

10. The method of claim 9, wherein the importance level associated with each link is a functional road classification (FRC).

11. The method of claim 9, wherein said displaying comprises:
    selecting, for each of a plurality of sub-regions of a region around the departure node, a maximal reachable node, wherein the maximal reachable node is the furthest reachable node in the sub-region from the departure node; and
    determining a shape of the reachable area to be displayed by connecting the selected maximal reachable nodes.

12. The method of claim 1, wherein the plurality of links of the map data represent road segments of a road network, and wherein the departure node represents a current location of a vehicle on the road network.

13. A non-transitory computer readable medium comprising instructions that, when executed by one or more processors of a computing device, cause the computing device to perform the method according to claim 1.

14. A computing device, comprising one or more processors and a memory storing digital map data, said digital map data comprising a plurality of links connected by nodes representing navigable paths of a network, the one or more processors being arranged to perform a one-to-many route search on the digital map data by:
    searching the map data using a one-to-many route planning algorithm to explore links from a departure node so as to determine a reachable area for the departure node, said searching comprising: determining a first cost for each explored link using a cost function associated with the route planning algorithm; and determining a second cost for each explored link using an objective function, such that each node reached by the route planning algorithm has a first accumulated cost and a second accumulated cost, wherein the first accumulated cost is the minimum accumulation of first costs for links forming a route from the departure node to the node, wherein the second accumulated cost is the accumulation of second costs for the links forming the route from the departure node to the node, and wherein the reachable area is based on a predetermined second accumulated cost value, such that a node is identified as unreachable when the second accumulated cost for the node exceeds the predetermined second accumulated cost value, wherein the searching of the map data is limited to a search boundary, wherein the first accumulated cost value defining the search boundary is based upon the first accumulated cost of the first unreachable node identified by the searching of the map data; and causing a representation of the determined reachable area to be displayed on a display device.

15. A computer implemented method of performing a one-to-many route search on digital map data, said digital map data comprising a plurality of links connected by nodes representing navigable paths of a network, the method comprising:

searching the map data using a one-to-many route planning algorithm to explore links from a departure node representative of a current location of a user so as to determine a reachable area for the departure node, said searching comprising: determining a first cost for each explored link using a cost function associated with the route planning algorithm; and determining a second cost for each explored link using an objective function, such that each node reached by the route planning algorithm has a first accumulated cost and a second accumulated cost, wherein the first accumulated cost is the minimum accumulation of first costs for links forming a route from the departure node to the node, wherein the second accumulated cost is the accumulation of second costs for the links forming the route from the departure node to the node, and wherein the reachable area is based on a predetermined second accumulated cost value, such that a node is identified as unreachable when the second accumulated cost for the node exceeds the predetermined second accumulated cost value, the method further comprising:

obtaining the locations of points of interest (POI) in a region around the departure node, each POI being associated with the nearest node of the map data;

checking, for nodes associated with a POI reached by the route planning algorithm, the reachability of the POI from the departure node, so as to identify at least one POI as reachable;

obtaining availability information for the at least one reachable POI;

using the obtained availability information for a current time or an expected arrival time at each of the at least one reachable POI, so as to identify at least one reachable POI as available;

determining a route from the departure node to an available POI using the map data; and generating instructions to guide the user along the determined route.

16. The method of claim 15, further comprising using a booking system associated with an available POI to book the POI at the expected arrival time.

17. A non-transitory computer readable medium comprising instructions that, when executed by one or more processors of a computing device, cause the computing device to perform the method according to claim 15.

* * * * *